US008223459B2

(12) United States Patent
Gage et al.

(10) Patent No.: US 8,223,459 B2
(45) Date of Patent: Jul. 17, 2012

(54) LASER ON SLIDER FOR A HEAT ASSISTED MAGNETIC RECORDING HEAD

(75) Inventors: Edward Charles Gage, Mars, PA (US); Michael Allen Seigler, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 1070 days.

(21) Appl. No.: 12/137,704

(22) Filed: Jun. 12, 2008

(65) Prior Publication Data

US 2009/0310459 A1 Dec. 17, 2009

(51) Int. Cl.
*G11B 5/00* (2006.01)
*G11B 7/00* (2006.01)

(52) U.S. Cl. .................................. 360/235.4; 369/300

(58) Field of Classification Search .................. 369/300, 369/124.01, 13.24, 112.27; 360/59, 235.4, 360/125.06, 125.31, 317
See application file for complete search history.

(56) References Cited

U.S. PATENT DOCUMENTS

| 5,986,978 | A | 11/1999 | Rottmayer et al. |
| 6,016,290 | A | 1/2000 | Chen et al. |
| 6,762,977 | B1 | 7/2004 | Gage et al. |
| 6,963,530 | B1 | 11/2005 | Thornton et al. |
| 7,003,196 | B2 | 2/2006 | Ghiron et al. |
| 7,158,470 | B2 | 1/2007 | Thornton et al. |
| 7,236,332 | B2 * | 6/2007 | Stipe ............................. 360/317 |
| 7,649,677 | B2 * | 1/2010 | Jin et al. ......................... 359/325 |
| 7,729,085 | B2 * | 6/2010 | Jin et al. ..................... 360/125.31 |
| 8,107,326 | B1 * | 1/2012 | Hirano et al. .............. 369/13.33 |
| 2003/0174834 | A1 * | 9/2003 | Kida ......................... 379/428.01 |
| 2004/0001420 | A1 * | 1/2004 | Challener ................. 369/112.27 |
| 2005/0122850 | A1 * | 6/2005 | Challener et al. .......... 369/13.24 |
| 2006/0067001 | A1 * | 3/2006 | Hsu et al. .................... 360/234.3 |
| 2006/0090178 | A1 * | 4/2006 | Stipe ............................. 720/659 |
| 2006/0164960 | A1 * | 7/2006 | Poon et al. ............... 369/124.01 |
| 2007/0026263 | A1 * | 2/2007 | Kubota et al. ................. 428/832 |
| 2007/0172705 | A1 * | 7/2007 | Weller et al. .................. 428/827 |
| 2007/0230010 | A1 * | 10/2007 | Jin et al. .......................... 360/69 |
| 2007/0230047 | A1 * | 10/2007 | Jin et al. ......................... 360/126 |
| 2008/0151427 | A1 * | 6/2008 | Poon et al. ................. 360/235.4 |
| 2010/0214685 | A1 * | 8/2010 | Seigler et al. ................... 360/59 |
| 2010/0328807 | A1 * | 12/2010 | Snyder et al. ................... 360/59 |

OTHER PUBLICATIONS

F. Van Laere et al., "Compact grating couplers between optical fibers and Silicon-on-Insulator photonic wire waveguides with 69% coupling efficiency", Optical Society of America, 2006, 3 pgs.
G. Roelkens et al., "High efficiency Silicon-on-Insulator grating coupler based on a poly-Silicon overlay", Optics Express, vol. 14, No. 24, Nov. 27, 2006, pp. 11622-11630.

* cited by examiner

*Primary Examiner* — Allen Cao
(74) *Attorney, Agent, or Firm* — Pietragallo Bosick & Gordon

(57) ABSTRACT

A recording head includes a magnetic write pole having an end positioned adjacent to an air bearing surface, a first waveguide having an end positioned adjacent to the air bearing surface, a laser, and a coupler for coupling light from the laser to the waveguide. The coupler can include a grating positioned in or adjacent to a lasing cavity of the laser.

18 Claims, 4 Drawing Sheets

LASER ON SLIDER FOR A HEAT ASSISTED MAGNETIC RECORDING HEAD

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

BACKGROUND

For heat assisted magnetic recording (HAMR), electromagnetic radiation is used to heat a portion of a surface of a magnetic storage medium. This facilitates the subsequent recording of magnetic information in the heated portion of the medium. Heat assisted magnetic recording heads include a component for directing electromagnetic radiation onto the surface of the storage medium, and an associated component for producing a magnetic signal for affecting the magnetization of the storage medium.

Heat assisted magnetic recording utilizes an intense near-field optical source to elevate the temperature of the media. When applying a heat or light source to the medium, it is desirable to confine the heat or light to the track where writing is taking place and to generate the write field in close proximity to where the medium is heated to accomplish high areal density recording. It is desirable to provide an efficient technique for delivering relatively large amounts of light power to the recording medium confined to spots of, for example, 50 nm or less. A variety of transducer designs have been proposed for this purpose.

Light can be delivered to a recording head by placing a laser somewhere in the storage device and using a fiber/waveguide to direct the light to the head. Then the light can be coupled into a waveguide on the recording head.

SUMMARY

In a first aspect, the invention provides a recording head including a magnetic write pole having an end positioned adjacent to an air bearing surface, a first waveguide having an end positioned adjacent to the air bearing surface, a laser, and a coupler for coupling light from the laser to the waveguide. The coupler can include a grating positioned in or adjacent to a lasing cavity of the laser.

In another aspect, the invention provides a recording head including a magnetic write pole having an end positioned adjacent to an air bearing surface, a first waveguide having a first end positioned adjacent to the air bearing surface and a second enlarged end, and a laser mounted to direct light onto the enlarged end.

In another aspect, the invention provides a recording head including a magnetic write pole having an end positioned adjacent to an air bearing surface, a waveguide having a first end positioned adjacent to the air bearing surface, and a laser positioned adjacent to a portion of the first waveguide to evanescently couple light from the laser to the waveguide.

In another aspect, the invention provides a recording head including a magnetic write pole having an end positioned adjacent to an air bearing surface, and a laser having a first end positioned adjacent to the air bearing surface, wherein the laser includes a core layer having a generally parabolically shaped sidewall.

These and various other features and advantages will be apparent from a reading of the following detailed description.

DETAILED DESCRIPTION OF THE INVENTION

In various aspects, the invention encompasses apparatus that can be used in heat assisted magnetic recording or optical recording, as well as data storage devices that include the apparatus. In one aspect, the invention provides a manufacturable and efficient device for coupling light from a laser diode and into the waveguide of a HAMR recording head.

Figure 1:
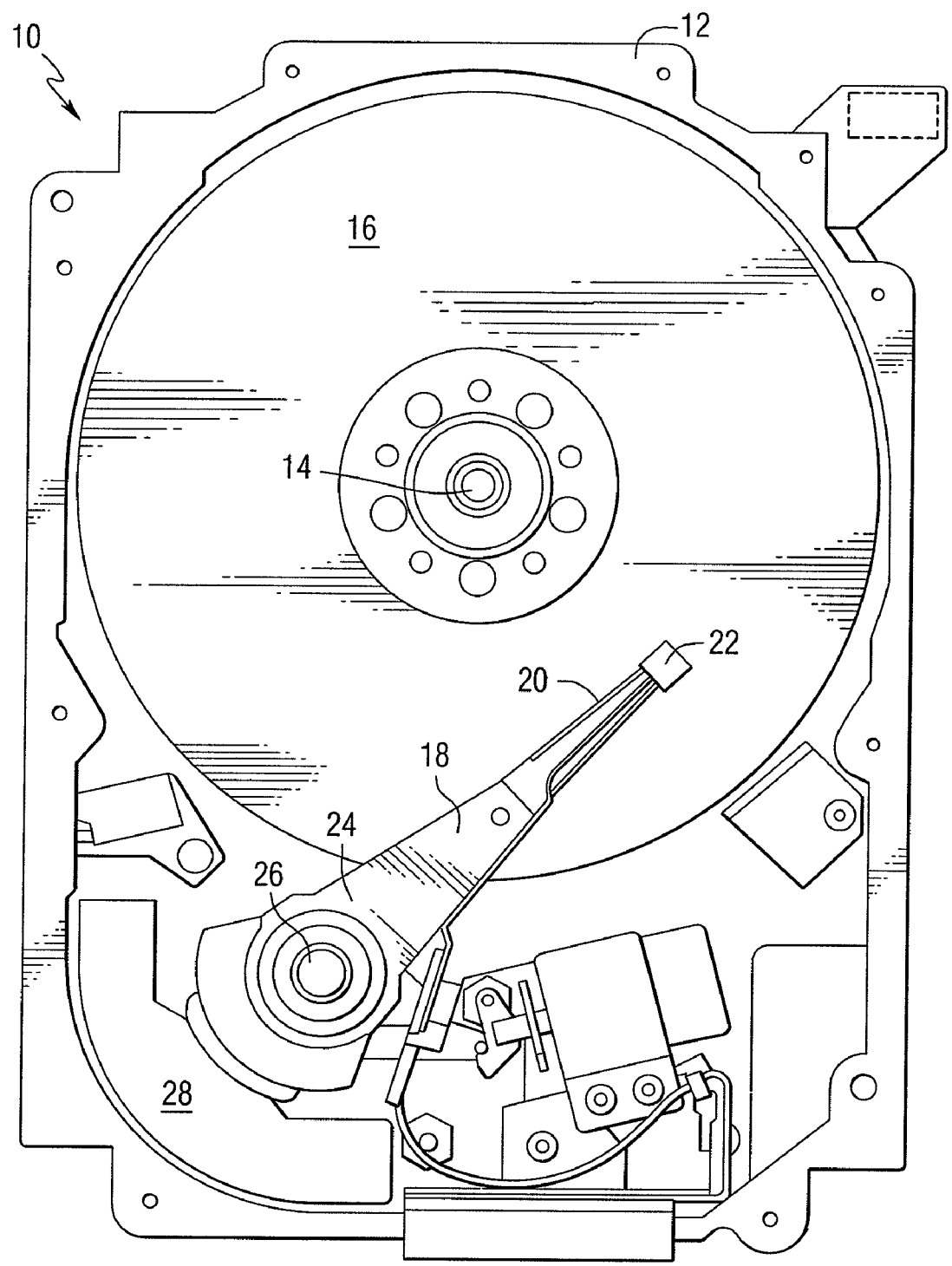
FIG. 1 is a pictorial representation of a disc drive that can include recording heads constructed in accordance with an aspect of this invention.

FIG. 1 is a pictorial representation of a data storage device in the form of a disc drive 10 that can utilize recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

Figure 2:
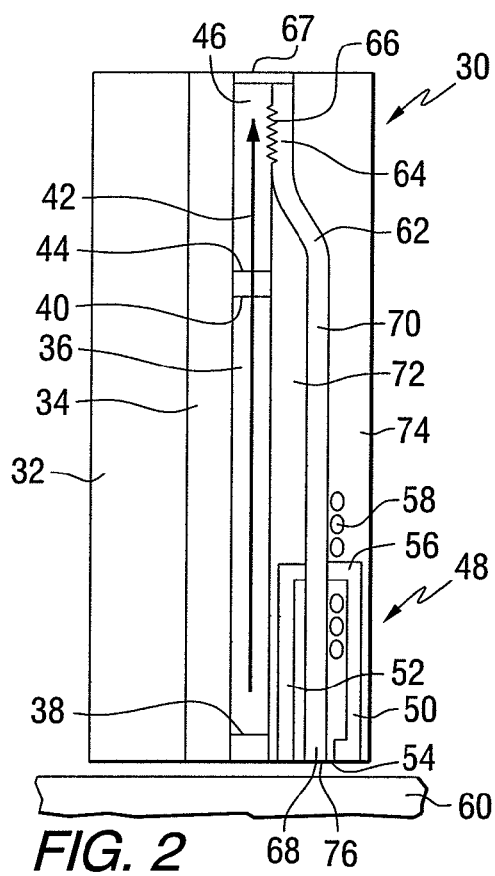
FIGS. 2-8 are schematic side views of portions of sliders in accordance with various aspects of the invention.

For heat assisted magnetic recording, a means is included for locally heating portions of the storage medium, to reduce the coercivity of the medium during the recording process. In a first aspect of the invention, a laser can be located in or on a recording head or slider. FIG. 2 is a schematic side view of a portion of a slider 30 constructed in accordance with an aspect of this invention. The slider includes a body 32, which may be made of any suitable material such as silicon, aluminum titanium carbide or gallium arsenide. A substrate 34, which can be for example GaAs is positioned on, or supported by, the body. A laser diode 36 is positioned adjacent to the substrate. The laser can be epitaxially grown, using for example metal oxide chemical vapor deposition (MOCVD) or molecular beam epitaxy (MBE), on the substrate. The substrate can be bonded to the slider body material. The laser can be constructed of, for example, AlGaAs, GaAs, AlGaInP, GaN, AlGaN or InGaN.

The laser includes etched and coated facets 38 and 40, and is structured and arranged to produce a beam of light 42 that exits an end 44 of the laser and is coupled into a first waveguide 46. A magnetic writer section 48 is positioned adjacent to the laser and the first waveguide. The magnetic writer section includes a write pole 50 and a return pole 52. Ends of the write pole and the return pole are positioned adjacent to an air bearing surface 54 of the slider. A pillar or yoke 56 is used to magnetically couple the write pole and the return pole. A coil 58 can be energized with a write current that induces a magnetic field in the write pole to affect the magnetization of domains in an adjacent magnetic storage medium 60. A second waveguide 62 extends between the write pole and the return pole. The second waveguide also has an end positioned adjacent to the air bearing surface. A portion 64 of the second waveguide 62 is structured and arranged to receive light from the laser diode. In this example, portion 64 is positioned adjacent to waveguide 46 and a grating 66 and mirror 67 are provided to couple light from the first waveguide to the second waveguide. A near-field transducer 68 can be provided near an end of the second waveguide, adjacent to the air bearing surface, to further concentrate the light energy into a small spot on the storage medium.

The second waveguide can be, for example, a solid immersion mirror that includes a core or guiding layer 70, which can be for example $Ta_2O_5$, $SiN_x$, $TiO_2$ or ZnS. The core guiding layer is sandwiched between cladding layers 72 and 74, which can be for example $Al_2O_3$ or $SiO_2$. The cladding layers are positioned on opposite sides of the guiding layer and would have a lower refractive index than the guiding layer. Air may be a suitable cladding layer. The waveguide 62 is shaped to condense an electromagnetic wave 42, which can be for example ultraviolet, infrared or visible light, to a focus or focal region adjacent to the end 76 of the waveguide. For the purposes of this description, this electromagnetic radiation will be referred to as light.

In one example, the edges of the core layer of the second waveguide can have a substantially parabolic shape to form a parabolic mirror. Light traveling in the guiding layer is reflected by the parabolic sidewalls and directed to the near-field transducer 68. The light excites surface plasmons on the near-field transducer 68, producing a high electric field surrounding the near-field transducer. Part of this field will tunnel into an adjacent storage medium and get absorbed, raising the temperature of the medium locally for recording.

In FIG. 2, the waveguide 62 is mounted on the slider to direct electromagnetic radiation such as ultraviolet, visible, or infrared light toward the storage medium. The waveguide 62 can be, for example, a planar solid immersion mirror, which directs light onto the near-field transducer. The waveguide coupler 66 can be, for example a grating coupler, or portions of the waveguides can be positioned adjacent to each other for evanescent coupling.

During operation of the slider, current is supplied to the write coil to create a magnetic field, and to the laser to cause emission of laser energy, which is directed toward the magnetic storage media. During write operations, the laser can be biased above a threshold to emit an optical beam. The media is designed to absorb a portion of the laser emission. The local optical absorption raises the temperature in a small area. The media may include a magnetic layer, which exhibits decreasing coercivity as a function of increasing temperature. The coercivity at room temperature is relatively high, resulting in very stable magnetic domains. When the laser is turned on, a region is heated, its coercivity drops, and then the magnetic writer switches the magnetic orientation of the media with a lower field.

Figure 3:
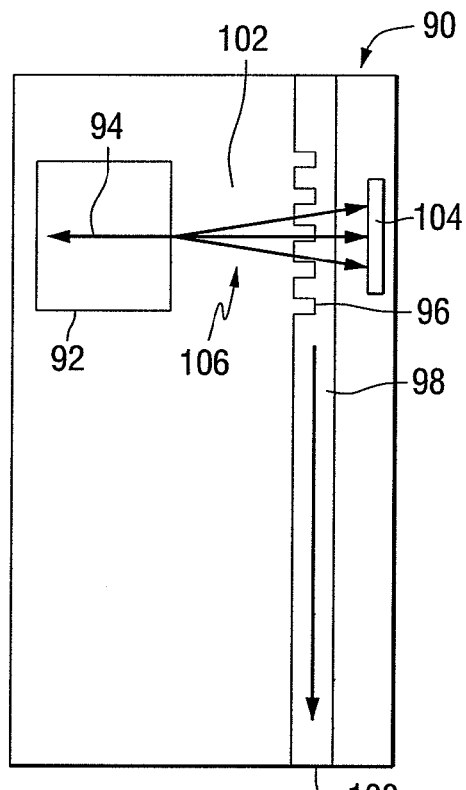

FIG. 3 is a schematic side view of a portion of a slider 90 in accordance with another aspect of the invention. A laser 92, which can be a vertical cavity surface emitting laser (VCSEL), is mounted on the slider and oriented to produce a light beam 94 that is directed onto a grating coupler 96 on a waveguide 98. The grating lies in a plane substantially perpendicular to the direction of propagation of light into the grating. In FIG. 3, only the core guiding layer of waveguide 98 is shown. While the light beam strikes the grating coupler at about a 90° angle in this example, in other examples, the components can be positioned such that the light strikes the grating at other angles. For example, the laser could also be placed on top of the grating at an angle of about 15° so that it is pointing in the direction that the light will propagate in the waveguide. Light is coupled in the waveguide 98 and directed toward an air bearing surface 100.

The laser beam would be emitted from the VCSEL and then propagate through a top cladding layer 102 that is on top of the grating. The top cladding layer can be, for example, a material such as $AlO_x$ or $SiO_x$. A mirror 104 can be provided to reflect the light back to the laser, and to extend the laser cavity 106 between the mirror and the laser.

In another example, a lens 108 may be formed in the top cladding layer between the laser and the grating to shape the beam before striking the grating.

Figure 4:
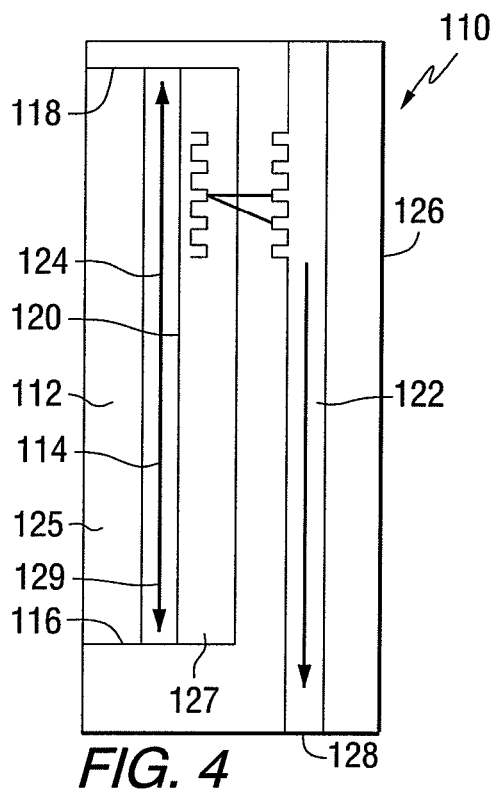

FIG. 4 is a schematic side view of a portion of another slider 110 in accordance with another aspects of the invention. A laser 112 is mounted on the slider and oriented to produce a light beam 114 that is reflected between ends 116 and 118 of the laser. A coupling structure 120 is used to couple light from the laser to a waveguide 122. The coupling structure includes a first grating 124 positioned adjacent to the laser and a second grating 126 positioned adjacent to the waveguide 122. The first grating 124 can be placed adjacent to the laser cavity or in the laser cavity. In the example of FIG. 4, the first grating lies in a plane substantially parallel to the direction of propagation of light in the laser cavity, and the second grating lies in a plane substantially parallel to the direction of propagation of the light in the waveguide. The light beam is coupled into the waveguide 122 and directed toward an air bearing surface 128.

The laser includes two cladding layers 125, 127 and a guiding layer 129. The grating 126 may be adjacent to or in the guiding layer 122. If the grating is in the guiding layer, it could be a part of the lasing cavity. Alternatively, the grating 126 may be spaced from the guiding layer.

Figure 5:
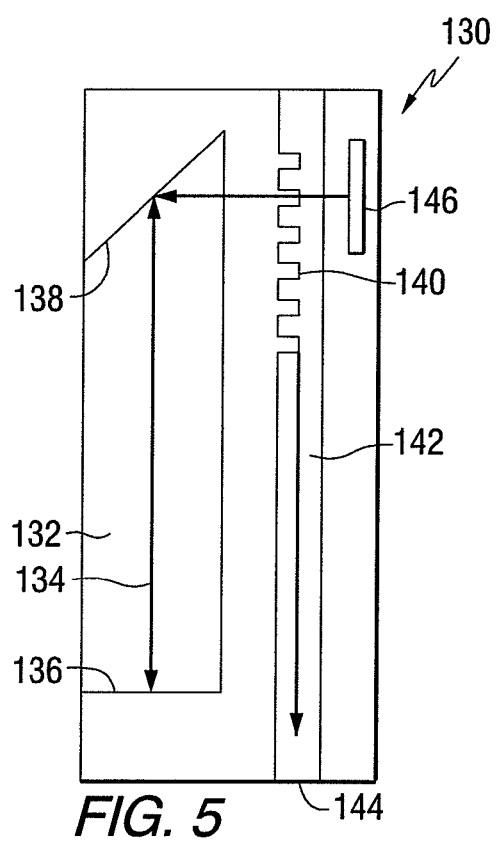

FIG. 5 is a schematic side view of a portion of another slider 130 in accordance with another aspect of the invention. A laser 132 is mounted on the slider and oriented to produce a light beam 134 that is reflected by a first end 136 toward a first mirror 138 that is positioned adjacent to a second end of the laser. The light beam 134 is directed onto a grating coupler 140 on a waveguide 142. Light is coupled into the waveguide 142 and directed toward an air bearing surface 144. A second mirror 146 can be provided to reflect the light back into the laser, thereby creating a lasing cavity that included the grating 140.

Figure 6:
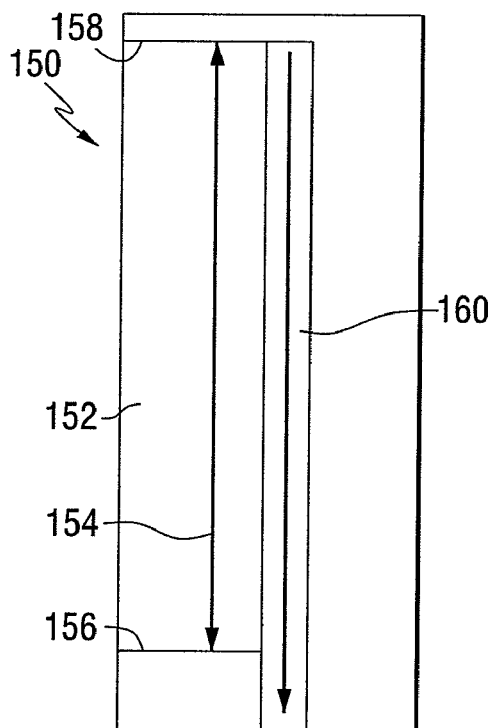

FIG. 6 is a schematic side view of a portion of another slider 150 in accordance with another aspect of the invention. A laser 152 is mounted on the slider and oriented to produce a light beam 154 that is reflected between ends 156 and 158 of the laser. A waveguide 160 is positioned adjacent to the laser. In this example, the light beam is evanescently coupled in the waveguide 160 and directed toward an air bearing surface 162.

Figure 7:
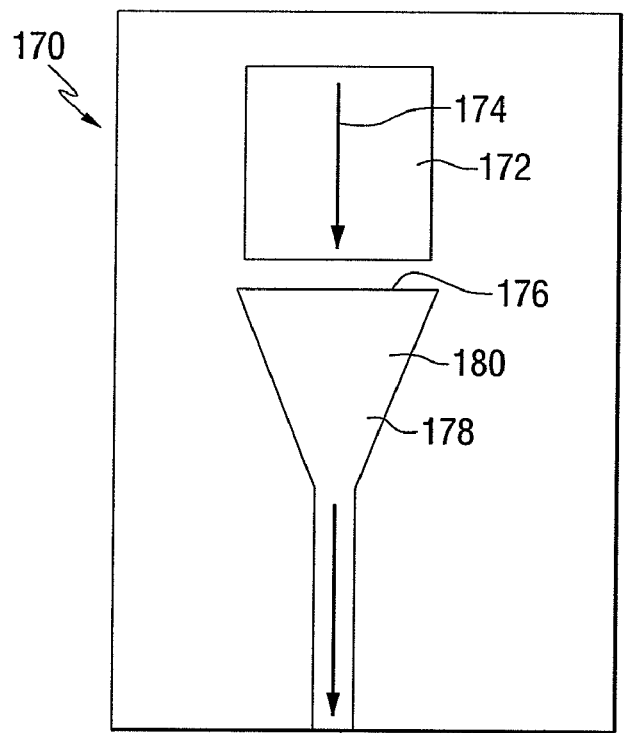

FIG. 7 is a schematic side view of a portion of another slider 170 in accordance with another aspect of the invention. A laser 172 is mounted on the slider and oriented to produce a light beam 174 that is directed onto an end 176 of a waveguide 178. The waveguide includes a tapered portion 180 such that the end 176 is wider than the body of the waveguide. The light beam is coupled in the waveguide 178 and directed toward an air bearing surface 182.

Figure 8:
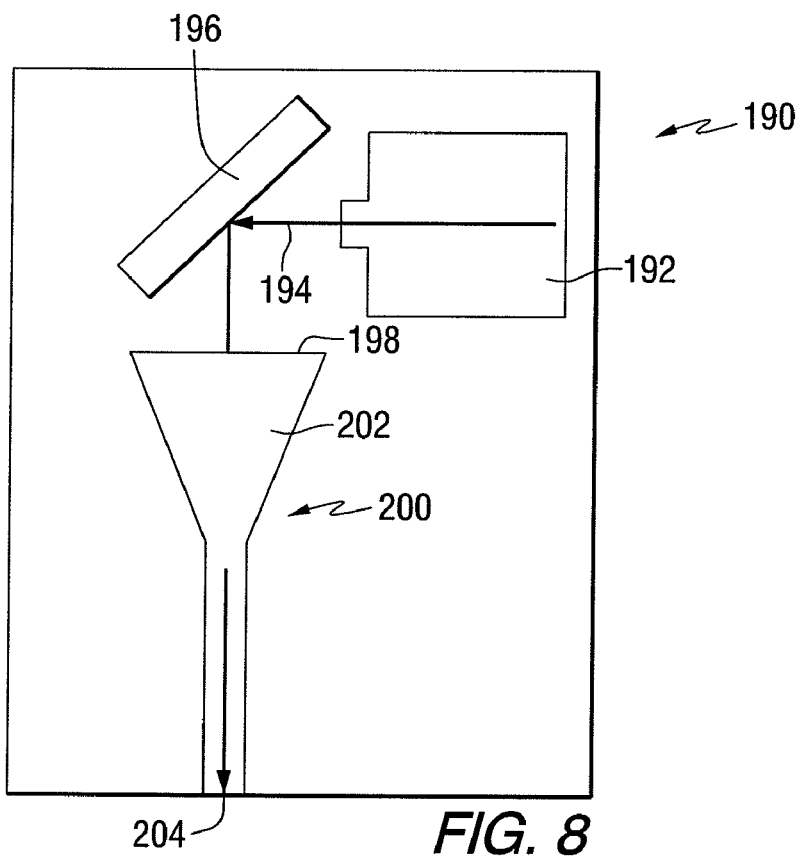

FIG. 8 is a schematic side view of a portion of another slider 190 in accordance with another aspect of the invention. A laser 192 is mounted on the slider and oriented to produce a light beam 194 that is reflected by a mirror 196 and directed onto an end 198 of a waveguide 200. The waveguide includes a tapered portion 202 such that the end 198 is wider than the body of the waveguide. The light beam is coupled in the waveguide 200 and directed toward an air bearing surface 204. In this example, the tapered portion is symmetric about a centerline of the waveguide.

The sliders of FIGS. 3 through 8 can include a magnetic writer section as shown in FIG. 2. The writer section is not shown in FIGS. 3 through 8 so that the optical components can be clearly seen. In addition, the waveguide of FIGS. 3-8 can be, for example, a solid immersion mirror that includes a core or guiding layer, which can be for example $Ta_2O_5$, $SiN_x$, $TiO_2$ or ZnS. The core guiding layer would be sandwiched between cladding layers, which can be for example $Al_2O_3$ or $SiO_2$. The cladding layers would be positioned on opposite sides of the guiding layer and would have a lower refractive index than the guiding layer. Air may be a suitable cladding layer. The waveguide could be shaped to condense light to a focus or focal region. As described with respect to FIG. 2, the edges of the core layer of the waveguide can have a substantially parabolic shape to form a parabolic mirror. Light traveling in the guiding layer can be reflected by the parabolic sidewalls and directed to the near-field transducer. In FIGS. 3 through 8, only the core guiding layer of waveguide is shown.

Figure 9:
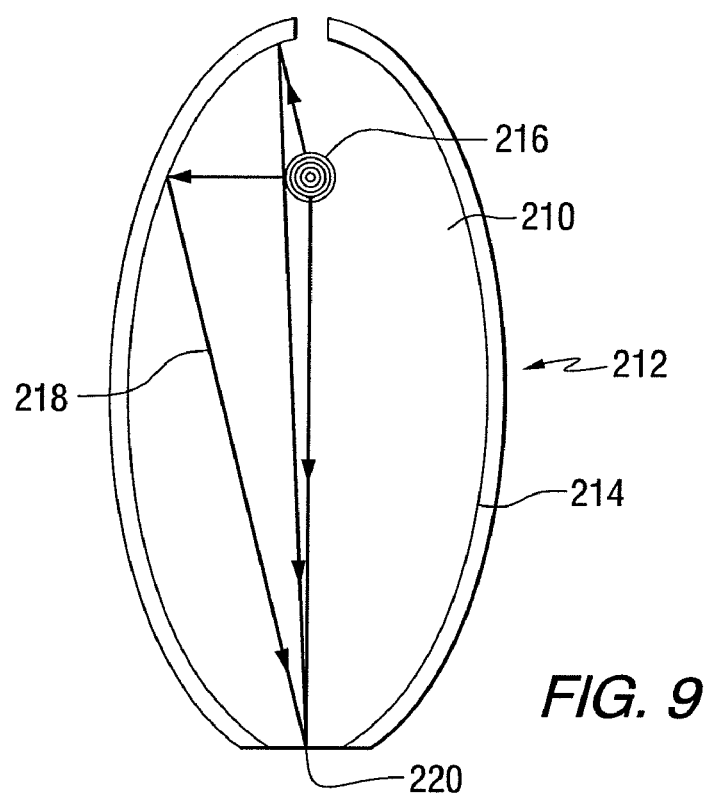
FIGS. 9 and 10 are side views of optical transducers that can be used in accordance with various aspects of the invention.

FIG. 9 is a side elevation view of a core layer 210 of a planar waveguide 212 that can be used in combination with several of the other examples. The core layer has a generally elliptically shaped sidewall 214. A grating 216 is positioned adjacent to the core layer to couple light into the waveguide. The refractive index of the core layer is greater than the refractive index of material at the edge of the core layer, such that light 218 that is coupled into the waveguide is reflected toward an end 220, which can be placed adjacent to an air bearing surface. The core layer can be sandwiched between cladding layers, not shown in this view.

In the example of FIG. 9, the grating 216 can be designed to replicate the shape of the beam. In one example, the grating includes a plurality of ridges and/or grooves shaped as concentric ovals. The waveguide is in the form of a solid immersion mirror (SIM) that includes a sidewall positioned around the grating so that it can collect substantially all of the light that is coupled into the waveguide and headed in different directions. The light that passes back under the grating may be coupled out and back into the laser. To address this issue, the sidewall can be spaced away from the grating to direct the light to the focal point without the light passing back under the grating. For example, the sidewall can have a substantially elliptical shape.

In various examples, the laser diode can be a standard edge emitting diode laser (SLD) or VCSEL. The output of the laser diode can be concentrated in a spot, a few microns by a few microns wide, and the SIM opening can be, for example, 50 µm wide.

Figure 10:
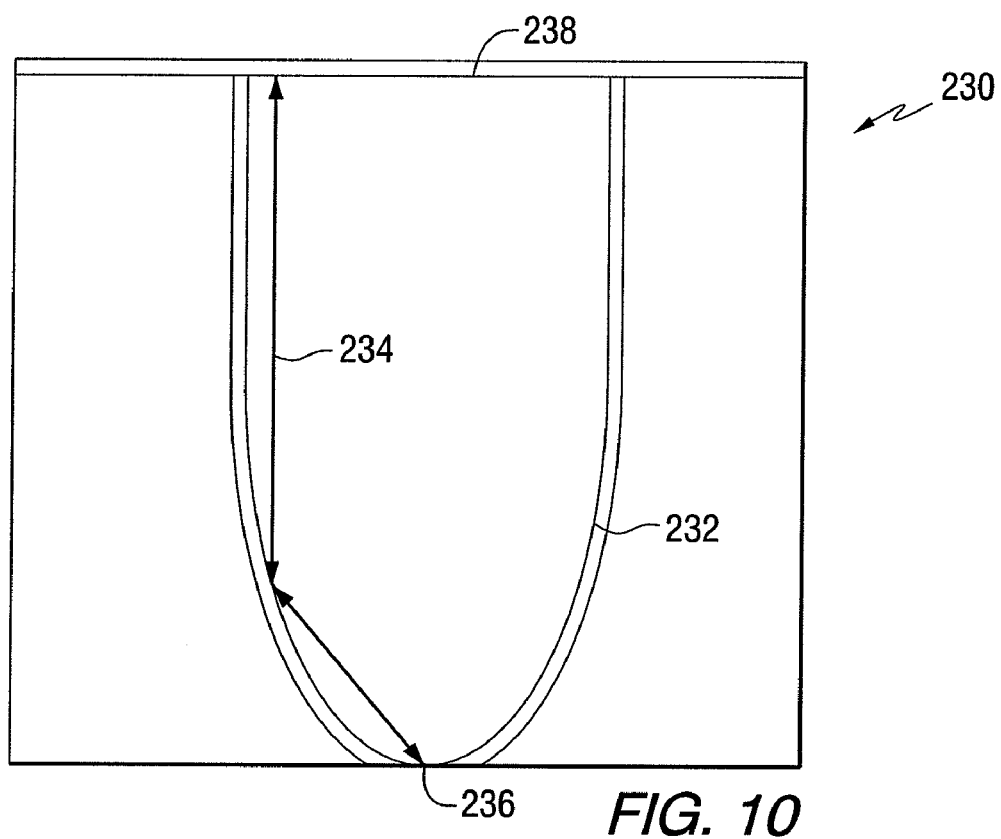

In another aspect, the laser can be integrated with the waveguide by providing a laser cavity having a shape that concentrates the light. FIG. 10 is a side elevation view of a laser diode 230 shaped in the form of a solid immersion mirror (SIM) planar waveguide that can be used in combination with several of the other examples. The SIM includes a core layer having a generally parabolically shaped sidewall 232. The refractive index of the core layer is greater than the refractive index of material at the edge of the core layer, such that light 234 in the waveguide is reflected toward an end 236, which can be placed adjacent to an air bearing surface. A reflective surface, such as a metallized surface 238, which may be a surface at the back of a slider, also reflects light toward the end 236. The laser of FIG. 10 could be incorporated into a slider, wherein the laser is mounted adjacent to the magnetic writer, such as that shown in FIG. 2, with the end 236 being positioned adjacent to an air bearing surface of the slider.

To fabricate the example of FIG. 10, a GaAs seedlayer can be applied to a recording head. The laser would then be grown on the seedlayer. The laser could be patterned along with a solid immersion mirror (SIM) waveguide. The ends of the cavity can be formed by polishing and metalizing both sides of a bar containing the laser. This process can be used to produce a parabolic laser cavity. This concept could be used to form high quality waveguide materials using this seedlayer.

There are several ways of locating the laser on the slider. In one example, the laser can be fabricated on a wafer that is used to subsequently fabricate multiple recording heads. In another example, the recording heads can be built on laser wafers. In yet another example, lasers can be bonded to a wafer that is used to subsequently fabricate recording heads or the recording heads can be bonded to laser wafers. In still another example, a single laser can be bonded to a single slider.

For a case where a laser is fabricated on a wafer that is used to subsequently fabricate recording heads, the starting substrate could be AlTiC, a single crystal semiconductor, or other material.

To build lasers on a wafer of heads, or to build heads on a wafer of lasers, a laser wafer or seedlayer can be bonded to an AlTiC substrate. Then layers of GaAs\etch stop\GaAsX can be bonded to the AlTiC or other recording head substrate. The GaAs can be etched away down to the etch stop, and the laser diode can be grown on the etch stop. The remainder of the head can then be fabricated on top of the laser diode.

For a case where lasers are bonded to a wafer that is used to subsequently fabricate recording heads, or the recording heads are bonded to laser wafers, alternative approaches include: bonding an entire wafer to an entire wafer; bonding one laser at a time to one head at a time on a wafer of heads; or bonding one head at a time to one laser at a time on a wafer of lasers. Multiple heads can be built on one substrate, the lasers could be built on a separate substrate, and then the two devices could be bonded together, while one of the devices is still in a wafer form.

For a case where a single laser is bonded to a single slider, a single laser can be bonded to a single head, or a bar of lasers could be bonded to a bar of sliders.

The method for coupling light to the waveguide on the recording head may depend on whether the laser diode is a VCSEL or standard laser diode (SLD). A grating coupler could be located directly over the output of the VCSEL, as illustrated in FIG. 3. The light from the standard laser diode could be turned 90° by a turning mirror or grating and then strike a grating to couple the light into the recording head waveguide. The 90° turning mirror and grating could be part of the lasing cavity, as illustrated in FIG. 5. The laser could be built before the recording head is built or after the recording head is built; this would determine whether the laser or recording head is on top in FIG. 6 allowing evanescent coupling.

The grating design can be adjusted for the specific application. Also, a lens could be fabricated between the laser and the grating using standard processes (e.g., gray scale lithography, etching, etc.).

If a laser substrate is used, first a laser (VCSEL or SLD) can be fabricated on a laser diode substrate, and then the head would be fabricated on top of the laser.

The resulting structures would be similar to FIGS. 3 through 6, except that the substrate would be a laser diode substrate, such as a III-V material (GaAs, . . . ). The laser diode substrate could then be used as the slider, or this structure could be bonded to another substrate (e.g., AlTiC) and the laser diode substrate etched away.

For the examples where the laser diode evanescently couples to the waveguide, a transparent electrode such as Indium Tin Oxide (ITO) could be used as a combination electrode and cladding layer to allow the laser diode and waveguide to be located very close to each other.

When the laser is integrally built into a slider, no light-delivery system including optical channels or fibers is needed to bring light to the slider, greatly simplifying the design of the data storage device.

The implementation described above and other implementations are within the scope of the following claims.

What is claimed is:

1. A recording head comprising:
a magnetic write pole having an end positioned adjacent to an air bearing surface;
a first waveguide having an end positioned adjacent to the air bearing surface;
a laser; and
a coupler for coupling light from the laser to the waveguide, wherein the coupler comprises a first grating positioned in or adjacent to a lasing cavity of the laser.

2. The recording head of claim 1, wherein the first grating is positioned in a plane substantially parallel to the lasing cavity.

3. The recording head of claim 1, wherein the coupler further comprises a second grating.

4. The recording head of claim 3, wherein the second grating comprises a plurality of oval shaped ridges or grooves.

5. The recording head of claim 4, wherein the first waveguide includes a substantially elliptically shaped sidewall.

6. The recording head of claim 4, wherein the first waveguide has a substantially elliptical shape.

7. A recording head comprising:
a magnetic write pole having an end positioned adjacent to an air bearing surface;
a first waveguide having a first end positioned adjacent to the air bearing surface and a second enlarged end; and
a laser mounted in the recording head to direct light onto the enlarged end.

8. The recording head of claim 7, wherein the first waveguide includes a tapered portion.

9. The recording head of claim 8, wherein the tapered portion is symmetrical about a centerline of the first waveguide.

10. The recording head of claim 7, further comprising:
a mirror for reflecting the light from the laser to the enlarged end.

11. The recording head of claim 7, further comprising:
a mirror positioned to reflect light from the laser onto the enlarged end.

12. A recording head comprising:
a magnetic write pole having an end positioned adjacent to an air bearing surface;
a waveguide having a first end positioned adjacent to the air bearing surface; and
a laser oriented to produce a light beam in a direction parallel to the waveguide and positioned adjacent to a portion of the waveguide to evanescently couple light from the laser to the waveguide.

13. The recording head of claim 12, wherein the waveguide comprises a solid immersion mirror.

14. The recording head of claim 12, wherein the waveguide has a substantially elliptical shape.

15. The recording head of claim 12, wherein the laser includes:
a combination electrode and cladding layer including tin oxide.

16. The recording head of claim 15, further comprising:
a first mirror for reflecting light from the second waveguide to the coupler.

17. A recording head comprising:
a magnetic write pole having an end positioned adjacent to an air bearing surface;
a laser having a first end positioned adjacent to the air bearing surface, wherein the laser includes a core layer having a generally parabolically shaped sidewall; and
a reflective surface positioned at a second end of the laser.

18. A recording head comprising:
a magnetic write pole having an end positioned adjacent to an air bearing surface;
a first waveguide having an end positioned adjacent to the air bearing surface;
a laser;
a coupler for coupling light from the laser to the waveguide; and
a second waveguide positioned to receive light from the laser and to transmit light to the coupler.

* * * * *